(12) United States Patent
Bilodeau et al.

(10) Patent No.: US 10,570,563 B2
(45) Date of Patent: Feb. 25, 2020

(54) METHODS OF CONTROLLING THE HYDROPHILICITY OF CELLULOSE

(71) Applicant: University of Maine System Board of Trustees, Bangor, ME (US)

(72) Inventors: Michael A. Bilodeau, Brewer, ME (US); Jonathan Spender, Enfield, ME (US)

(73) Assignee: University of Maine System Board of Trustees, Bangor, ME (US)

( * ) Notice: Subject to any disclaimer, the term of this patent is extended or adjusted under 35 U.S.C. 154(b) by 0 days.

(21) Appl. No.: 15/573,712

(22) PCT Filed: May 13, 2016

(86) PCT No.: PCT/US2016/032381
§ 371 (c)(1),
(2) Date: Nov. 13, 2017

(87) PCT Pub. No.: WO2016/183453
PCT Pub. Date: Nov. 17, 2016

(65) Prior Publication Data
US 2018/0142411 A1    May 24, 2018

Related U.S. Application Data

(60) Provisional application No. 62/161,341, filed on May 14, 2015.

(51) Int. Cl.
| | | |
|---|---|---|
| *D21C 9/00* | (2006.01) | |
| *D21H 11/16* | (2006.01) | |
| *D06M 11/76* | (2006.01) | |
| *D06M 13/184* | (2006.01) | |
| *C08B 3/20* | (2006.01) | |
| *D06M 101/06* | (2006.01) | |

(52) U.S. Cl.
CPC .............. *D21C 9/005* (2013.01); *C08B 3/20* (2013.01); *D06M 11/76* (2013.01); *D06M 13/184* (2013.01); *D21H 11/16* (2013.01); *D06M 2101/06* (2013.01)

(58) Field of Classification Search
USPC ...................................... 162/157.6
See application file for complete search history.

(56) References Cited

U.S. PATENT DOCUMENTS

| | | |
|---|---|---|
| 2,759,787 A | 8/1956 | Touey et al. |
| 4,260,740 A | 4/1981 | Carrington et al. |
| 5,137,537 A | 8/1992 | Herron et al. |
| 6,776,876 B1 | 8/2004 | Vuorinen et al. |
| 2003/0037891 A1 | 2/2003 | Jewell |
| 2007/0051481 A1 | 3/2007 | Tan et al. |
| 2011/0319509 A1 | 12/2011 | Dorgan et al. |
| 2015/0045549 A1 | 2/2015 | Laukkanen et al. |

FOREIGN PATENT DOCUMENTS

| | | |
|---|---|---|
| EP | 1827645 A1 | 9/2007 |
| WO | WO-2006/066586 A1 | 6/2006 |
| WO | WO-2014/070092 A1 | 5/2014 |
| WO | WO-2016/183453 A1 | 11/2016 |

OTHER PUBLICATIONS

Cheng, Q. et al, Water Retention Value Measurements of Cellulosic Materials Using a Centrifuge Technique, BioResources, 5(3): 1945-1954 (2010).
International Search Report for PCT/US16/32381, 3 pages (Aug. 18, 2016).
Written Opinion for PCT/US16/32381, 7 pages (Aug. 18, 2016).

*Primary Examiner* — Mark Halpern
(74) *Attorney, Agent, or Firm* — Choate Hall & Stewart, LLP; Brian E. Reese; Meaghan E. Bychowski

(57) ABSTRACT

In some embodiments, the present invention provides methods including the steps of providing cellulosic material, associating the cellulosic material with an organic acid (e.g., lactic acid) to form a mixture, and heating the mixture to a temperature between 100° C. and 120° C. for at least ten minutes to form a treated cellulosic material, wherein the water retention value of the treated cellulosic material is decreased by at least 10% as compared to untreated cellulosic material.

10 Claims, 10 Drawing Sheets

METHODS OF CONTROLLING THE HYDROPHILICITY OF CELLULOSE

This application is a 371 of PCT/US/32381 filed 13 May 2016

BACKGROUND

There is a growing interest in displacing the use of petroleum-based materials such as thermoplastics across many industries, for example, packaging, automotive parts, adhesives, coatings, and composite materials. While cellulose is an additive used in some applications, its use in many areas, such as thermoplastics, is hampered by significant processing difficulties resulting from its material properties.

SUMMARY OF THE INVENTION

The present invention provides, inter alia, methods for modulating the hydrophilicity of cellulose. Cellulose normally is able to strongly interact with water, resulting in the formation of strong hydrogen bonds between cellulose surfaces upon drying. This propensity results in certain limits on the industrial applicability of cellulose, such as nanocellulose, due, among other reasons, to the difficulty in drying resulting compositions. Provided methods allow for modulation of the hydrophilicity of cellulose in various forms, thus allowing for the use of cellulose in processes and reactions previously considered unattractive for such use. By way of particular example, previous methods were unable to overcome the propensity of cellulose, and particularly nanocellulose, to form hydrogels, even at very low concentrations. As such, production of dry forms of the material were either unattainable, or prohibitively expensive for use. According to various aspects, provided methods overcome these and other issues with previously known methods.

In some embodiments, the present invention provides methods including the steps of providing cellulosic material, associating the cellulosic material with an organic acid (e.g., lactic acid) to form a mixture, and heating the mixture to a temperature between 100° C. and 120° C. for at least ten minutes to form a treated cellulosic material, wherein the water retention value of the treated cellulosic material is decreased by at least 10% as compared to untreated cellulosic material. In some embodiments, the organic acid is associated with the cellulosic material in a ratio of at least 1:1 by weight. In some embodiments, the organic acid is associated with the cellulosic material in a ratio of at least 6:1 by weight.

According to various embodiments, any of a variety of cellulosic materials may be used in provided methods. In some embodiments, the cellulosic material is selected from the group consisting of wood, wood waste, spent pulping/fractionation liquors, algal biomass, food waste, grasses, straw, corn stover, corn fiber, agricultural products and residuals, forest residuals, saw dust, wood shavings, sludges and municipal solid waste, bacterial cellulose and mixtures thereof. In some embodiments, the cellulosic material is nanocellulose. In some embodiments, the nanocellulose is or comprises cellulose nanofibrils or cellulose nanocrystals.

According to various embodiments, the mixture may be heated for any application-appropriate period of time. In some embodiments, the mixture is heated for at least 1 minute (e.g., 1, 2, 3, 4, 5, 10, 15, 20, 25, 30, 35, 40, 45, 50, or 55 minutes or more). In some embodiments, the mixture is heated for at least 1 hour (e.g., 1.5, 2, 3, 4, 5, 6, 7, 8, 9, 10, 11, or 12 hours or more). In some embodiments, the mixture is heated for at least 24 hours (e.g., 30 hours, 40 hours, 48 hours, 72 hours, 96 hours, 120 hours or more).

Various embodiments will allow for varying degrees of reduced water retention value in a particular cellulosic material. In some embodiments, the WRV of a treated cellulosic material is decreased by at least 10% (e.g., 20%, 30%, 40%, 50%, 60%, 70% or more) as compared to untreated cellulosic material. In some embodiments, the WRV is decreased by at least 50%.

In some embodiments, at least one of the associating and heating steps is carried out at a pressure at or below atmospheric pressure. In some embodiments, at least one of the associating and heating steps is carried out at a pressure above atmospheric pressure.

In some embodiments, the present invention also provides compositions comprising at least 20% (e.g., 30%, 40%, 50%, 60%, 70%, 80% or more) by weight of a treated cellulosic material (e.g., fibers) produced by a method according to any method provided herein.

As used in this application, the terms "about" and "approximately" are used as equivalents. Any citations to publications, patents, or patent applications herein are incorporated by reference in their entirety. Any numerals used in this application with or without about/approximately are meant to cover any normal fluctuations appreciated by one of ordinary skill in the relevant art.

Other features, objects, and advantages of the present invention are apparent in the detailed description that follows. It should be understood, however, that the detailed description, while indicating embodiments of the present invention, is given by way of illustration only, not limitation. Various changes and modifications within the scope of the invention will become apparent to those skilled in the art from the detailed description.

DEFINITIONS

Figure 1:
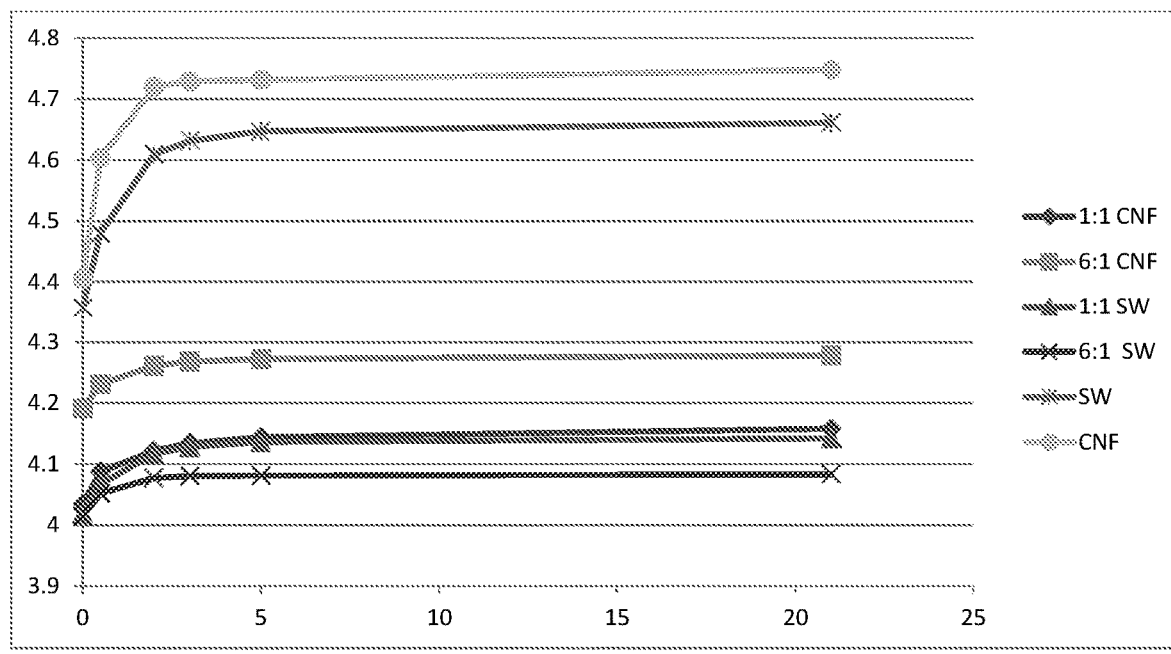
FIG. 1 shows a graph of exemplary moisture retention values of various samples.

In order for the present invention to be more readily understood, certain terms are first defined below. Additional definitions for the following terms and other terms are set forth throughout the specification.

Approximately or about: As used herein, the term "approximately" or "about," as applied to one or more values of interest, refers to a value that is similar to a stated reference value. In certain embodiments, the term "approximately" or "about" refers to a range of values that fall within 25%, 20%, 19%, 18%, 17%, 16%, 15%, 14%, 13%, 12%, 11%, 10%, 9%, 8%, 7%, 6%, 5%, 4%, 3%, 2%, 1%, or less in either direction (greater than or less than) of the stated reference value unless otherwise stated or otherwise evident from the context (except where such number would exceed 100% of a possible value).

Cellulose Nanofibrils: As used herein, the term "cellulose nanofibrils" refers to the state of cellulosic material wherein at least 75% of the cellulosic material would be considered to be "fines". In some embodiments, the proportion of cellulosic material that may be considered fines may be much higher such as 80%, 85%, 90%, 95%, 99% or higher. In this disclosure, the terms "nanofibrils", nanocellulose, highly fibrillated cellulose, super-fibrillated cellulose are all considered synonymous with cellulose nanofibrils.

Cellulose Nanocrystals: As used herein, the term "cellulose nanocrystals" refers to the state of cellulosic material wherein at least 75% of the cellulosic material would be considered to be "fines" and more that 50% of the original unorganized or amorphous cellulose content has been removed. In some embodiments, the proportion of cellulosic material that may be considered fines may be much higher such as 80%, 85%, 90%, 95%, 99% or higher, and more that 50% of the original unorganized or amorphous cellulose content has been removed.

Fines: As used herein, the term "fines" refers to cellulosic material, or a portion of a cellulosic fiber with a length weighted fiber length of less than 0.2 mm. In some embodiments, "fines" may refer to a cellulosic material that has a diameter of between 5 nm-100 nm, inclusive, and has a high surface to volume ratio. Improve, increase, or reduce: As used herein, the terms "improve," "increase" or "reduce," or grammatical equivalents, indicate values that are relative to a baseline measurement, such as a measurement in the same sample prior to initiation of a treatment described herein, or a measurement in a control sample (or multiple control samples) in the absence of a treatment described herein.

Substantially: As used herein, the term "substantially" refers to the qualitative condition of exhibiting total or near-total extent or degree of a characteristic or property of interest. One of ordinary skill in the chemical arts will understand that biological and chemical phenomena rarely, if ever, go to completion and/or proceed to completeness or achieve or avoid an absolute result. The term "substantially" is therefore used herein to capture the potential lack of completeness inherent in many biological and chemical phenomena.

Water retention value: As used herein, the term "water retention value," or WRV, refers to the ratio of mass (weight) of water retained after centrifugation under specified conditions by a wet (i.e., undried) sample to the oven-dry mass (weight) of the same sample.

DETAILED DESCRIPTION OF CERTAIN EMBODIMENTS

The present invention provides, inter alia, novel methods of modulating the hydrophilicity of cellulose, including nanocellulose, as well as compositions created using provided methods.

In some embodiments, the present invention provides methods including the steps of providing cellulosic material, associating the cellulosic material with an organic acid to form a mixture, and heating the mixture to a temperature between 100° C. and 120° C. for at least ten minutes to form a treated cellulosic material, wherein the water retention value of the treated cellulosic material is decreased by at least 10% as compared to untreated cellulosic material. In some embodiments, the organic acid is associated with the cellulosic material in a ratio of at least 1:1 by weight. In some embodiments, the organic acid is associated with the cellulosic material in a ratio of at least 6:1 by weight.

Cellulosic Material

According to various embodiments, any of a variety of cellulosic materials may be used in provided methods. In some embodiments, the cellulosic material is selected from the group consisting of wood, wood waste, spent pulping/fractionation liquors, algal biomass, food waste, grasses, straw, corn stover, corn fiber, agricultural products and residuals, forest residuals, saw dust, wood shavings, sludges and municipal solid waste, bacterial cellulose and mixtures thereof. In some embodiments, the cellulosic material is or comprises pulp fibers, microcrystalline cellulose, and cellulosic fibril aggregates. In some embodiments, the cellulosic material is nanocellulose. In some embodiments, the nanocellulose is or comprises cellulose nanofibrils. In some embodiments, the cellulose nanofibrils are or comprise microfibrillated cellulose, nanocrystalline cellulose, and bacterial nanocellulose.

Acids

According to various embodiments, provided methods allow for the use of a range of acids, as desired or required by a specific application thereof. In some embodiments, an acid may be any organic acid. In some embodiments, an acid may be a carboxylic acid. In some embodiments, an acid is lactic acid. In some embodiments, an acid is selected from the group consisting of lactic acid, levulinic acid, formic acid, acetic acid, propionic acid, butyric acid, valeric acid, caproic acid, oxalic acid, oleic acid, malic acid, citric acid, benzoic acid, and carbonic acid. In some embodiments, only a single acid is used. In some embodiments, an acid may be a modified organic acid, including, but not limited to, Di-(2 ethylhexyl) phosphoric acid. In some embodiments, two or more acids are used. In some embodiments, an acid is a fluid (e.g., a liquid). In some embodiments, an acid (e.g., lactic acid) is not in solid form.

According to various embodiments, the amount/ratio of acid as compared to the amount of cellulosic material may vary considerably during the association step (s). In some embodiments, the ratio of acid to cellulosic material may be between 1:1 and 10:1 by weight. In some embodiments, the ratio of acid to cellulosic material is 6:1 by weight. In some embodiments, the ratio of acid to cellulosic material may be at least 1:1, 2:1, 3:1, 4:1, 5:1, 6:1, 7:1, 8:1, 9:1, or 10:1 by weight. In some embodiments, the ratio of acid to cellulosic material may be greater than 10:1 by weight (e.g., 11:1 or more). In some embodiments, the ratio of acid to cellulosic material may be less than 1:1. For example, in some embodiments, the ratio of acid to cellulosic material may be between 1:1 and 1:10 (e.g., 1:2, 1:3, 1:4, 1:5, 1:6, 1:7, 1:8, 1:9, or 1:10).

Associating

According to various embodiments, one or more forms of cellulosic material may be associated with an organic acid (e.g., lactic acid) to form a mixture in any application-appropriate manner, with certain examples being shown in the Examples below. In some embodiments, associating will be or comprise: simple mixing of an organic acid and cellulosic material. In some embodiments, associating the organic acid(s) with cellulosic material under high shear, kneading or folding conditions may be beneficial.

Treatment

According to various embodiments, a provided mixture may be treated in any of a variety of ways. For example, in some embodiments, a mixture may be heated and/or exposed to a metal catalyst. In some embodiments, a metal catalyst may be or comprise nickel, cobalt, hafnium, zirconium, palladium, gold, ruthemium, rhodium, combinations thereof, and/or compounds containing one or more of these metal catalysts. One of skill in the art will recognize additional metal catalysts that may be used as a substitute or additional metal catalyst to the exemplary metal catalysts listed herein. In some embodiments, a mixture may be heated to at least the boiling temperature of water. In some embodiments, a mixture may be heated to between 100° C. and 200° C. (e.g., 100° C. to 190° C., 100° C. to 180° C., 100° C. to 170° C., 100° C. to 160° C., 100° C. to 150° C., 100° C. to 140° C., 100° C. to 130° C.). In some embodiments, a mixture may be heated to between 100° C. and 120° C. According to various embodiments, provided mixtures may be heated using any known method of heating a substance including, by way of non-limiting example only, heating in an oven, heating via friction or mixing, microwave energy absorption, or radiant heating.

In some embodiments, a mixture may be heated for any application-appropriate period of time. In some embodiments, the mixture is heated for at least 1 minute (e.g., 1, 2, 3, 4, 5, 10, 15, 20, 25, 30, 35, 40, 45, 50, or 55 minutes or more). In some embodiments, the mixture is heated for at least 1 hour (e.g., 1.5, 2, 3, 4, 5, 6, 7, 8, 9, 10, 11, or 12 hours or more). In some embodiments, the mixture is heated for at least 24 hours (e.g., 30 hours, 40 hours, 48 hours, 72 hours, 96 hours, 120 hours or more).

Water Retention Value (WRV)

In some embodiments, provided methods allow for the production of modified cellulosic materials exhibiting a significantly reduced water retention values as compared to untreated cellulosic materials (control cellulosic materials) and/or those treated with previously known methods. Various embodiments will allow for varying degrees of reduced water retention value in a particular cellulosic material. In some embodiments, the WRV is decreased by at least 10% (e.g., 20%, 30%, 40%, 50%, 60%, 70% or more). In some embodiments, the WRV is decreased by at least 50%.

Methods of ascertaining the WRV of a sample are known in the art, including, for example, the methods described in Cheng et al, Cellulose water retention value, 2010, Bioresources, 5(3): 1945-1954. The Technical Association of Pulp and Paper Industry has also published a useful test method, TAPPI UM 256 um-15, that is also used to determine WRV of cellulose materials.

In some embodiments, the WRV can be measured under different conditions. In some embodiments, the WRV can be measured by determination of the quantity of water that fibers can absorb and retain under strictly controlled conditions. In some embodiments, factors that may influence WRV measurements include sample weights, centrifugal time and force, pore size of filters used in the measurement setup, and cellulosic particle/fibril size.

Percent Esterification

In some embodiments, provided methods allow for the production of modified cellulosic materials exhibiting a significantly increased degree of esterification as compared to untreated cellulosic materials (control cellulosic materials) and/or those treated with previously known methods. The degree of esterification may be assessed using any known method, including, as non-limiting examples, Fourier Transform Infrared Spectroscopy (FT-IR) and nuclear magnetic resonance (NMR). In some embodiments, provided modified cellulosic materials exhibit a degree of esterification that is at least 10% (e.g., at least 20%, 30%, 40%, 50%, 60%, 70%, 80%, 90%, 100% or more) higher than untreated/control cellulosic materials.

Other Exemplary Conditions and Considerations

Various embodiments may include reaction conditions occurring at any of a variety of pressures. In some embodiments, at least one of the associating and heating steps is carried out at a pressure at or below atmospheric pressure. In some embodiments, at least one of the associating and heating steps is carried out at a pressure above atmospheric pressure, for example, at a pressure between about 20 torr and about 3 bar (e.g., 15 torr to 3 bar, 10 torr to 3 bar, 5 torr to 3 bar, or 1 torr to 3 bar). In some embodiments, at least one of the associating and heating steps is carried out at a pressure equal to or greater than 20 torr. In some embodiments, at least one of the associating and heating steps is carried out at a pressure equal to or less than 3 bar.

Compositions/Treated Cellulosic Materials

In some embodiments, the present invention also provides compositions comprising at least 20% by weight of treated cellulosic material (e.g., fibers) produced according to any method provided herein. In some embodiments, provided compositions comprise at least 25% (e.g., 30%, 35%, 40%, 45%, 50%, 55%, 60%, 65%, 70%, 75%, 80%, 85% or more) treated cellulosic material (e.g., fibers) produced according to provided methods.

According to various embodiments, provided compositions comprising treated cellulosic materials may be produced in a variety of forms. In some embodiments, compositions comprising provided treated cellulosic materials may be provided in a format selected from fibers, coatings, mats, films, foams, gels, granules, or powders. As used herein, the term "powder" refers to a mixture of finely divided substances, for example, chemicals, in dry form, while "granules" refers to agglomerates of powdered materials prepared into larger, free flowing particles. In some embodiments, use of provided treated cellulosic materials in a particular composition result in one or more of the following enhancements as compared to untreated cellulosic materials: decreased water retention value (WRV), increased tensile modulus, decreased tensile strength, decreased stretch, decreased total energy absorption (TEA), increased flexural strength, increased flexural modulus, and increased impact strength.

EXAMPLES

Example 1

Rate of Moisture Pick-Up

Moisture pickup of a modified cellulose sample in a controlled humidity and temperature room (50% RH, 70 F TAPPI standard test room) is shown in FIG. 1. In this Example, various samples of soft wood (SW) and cellulose nanofibers (CNF) were used and varying ratios of lactic acid to dry fiber. In the ratios shown in FIG. 1 and in Table 1 below, The first number is the parts of lactic acid by weight, the second number is the parts of dry fiber by weight. This % moisture content of the samples are plotted over time in hours. The data contain the rate of moisture pickup for softwood fibers as well as freeze dried CNF. The % moisture pick-up over time for increasing lactic acid treatment is also given.

Untreated CNF shows a higher equilibrium moisture content that CNF treated with lactic acid. Bleached softwood kraft pulp has a high, but slightly lower equilibrium moisture content compared to CNF. Treating the softwood fiber with lactic acid also lowers the equilibrium moisture pick-up of the fibers.

Table 1 shows the numerical data also presented in FIG. 1, along with the % moisture pickup by condition after 21 hours.

TABLE 1

| Hours | 1:1 cnf | 6:1 cnf | 1:1 sw | 6:1 sw | Softwood (SW) | Cellulose Nanofibers (CNF) |
|---|---|---|---|---|---|---|
| 0 | 4.034 | 4.191 | 4.018 | 4.014 | 4.356 | 4.405 |
| 0.5 | 4.087 | 4.231 | 4.067 | 4.052 | 4.48 | 4.603 |
| 2 | 4.122 | 4.261 | 4.117 | 4.077 | 4.609 | 4.72 |
| 3 | 4.134 | 4.268 | 4.128 | 4.08 | 4.631 | 4.729 |
| 5 | 4.144 | 4.272 | 4.136 | 4.081 | 4.647 | 4.731 |
| 21 | 4.158 | 4.278 | 4.142 | 4.083 | 4.661 | 4.748 |
| % Pickup | 2.98% | 2.03% | 2.99% | 1.69% | 6.54% | 7.22% |

Example 2

Effect of Lactic Acid on Cross-Fiber Bonding

In this example, bleached southern hardwood kraft pulp (Canadian Standard Freeness [CSF] ~385) was treated with lactic acid. This pulp was adjusted to 5% consistency and lactic acid was mixed in using a bench top mixer. The ratio of dry fiber to lactic acid in the resulting mixture was 1:1 by weight. This mixture was placed in an oven at 120° C. for approximately 48 hours, allowing the reaction between the lactic acid and fibers to proceed, as well as driving off the initial water and any water generated as a reaction product.

Several handsheets were made using the bleached southern hardwood kraft pulp, with various levels of esterified cellulose added to the handsheet. Table 2 contains test results for 0%, 5%, 10%, 20% and 30% addition, by weight, of the modified fibers added to the handsheets.

TABLE 2

| Addition rate of modified fiber | Basis Weight gsm | Caliper 0.001" | Tensile | | | | (TEA) | | Internal bond | |
|---|---|---|---|---|---|---|---|---|---|---|
| | | | Load lb | Std. Dev. | Stretch % | Std. Dev. | Integral (in. lb) | Std. dev. | Ft.lb./in^2 | Std. Dev. |
| 0% | 101.6 | 8.07 | 6.70 | 0.90 | 2.16 | 0.41 | 0.4172 | 0.15 | 0.074 | 0.012 |
| 5% | 100.1 | 8.27 | 4.81 | 0.25 | 1.73 | 0.34 | 0.2348 | 0.04 | 0.057 | 0.012 |
| 10% | 100.1 | 8.30 | 4.47 | 0.36 | 1.73 | 0.12 | 0.2204 | 0.04 | 0.047 | 0.011 |
| 20% | 98.4 | 8.34 | 3.33 | 0.84 | 1.1 | 0.16 | 0.0962 | 0.04 | 0.040 | 0.007 |
| 30% | 97.3 | 8.47 | 3.44 | 0.38 | 1.11 | 0.17 | 0.0906 | 0.03 | 0.037 | 0.004 |

The data shows that as the % lactic acid treatment increases, the bonding between fibers is reduced. Without wishing to be held to a particular theory, this hypothesis is supported by the increase in caliper, decrease in tensile strength, stretch, total energy absorbed (TEA) and internal bond of the hand sheets with increasing lactic acid treatment.

Example 3

Effect of Lactic Acid Treatment on Water Retention

This example shows how lactic acid treated fibers exhibit lower water holding capacity compared to untreated fiber. Water Retention Value test method (WRV) is a measure of the water content of fiber after it has been subjected to an elevated g force for a specific amount of time. The lower the ratio of gm of Water per gram of fiber, the lower the capacity of the fiber to interact and hold water within its structure.

Figure 2:
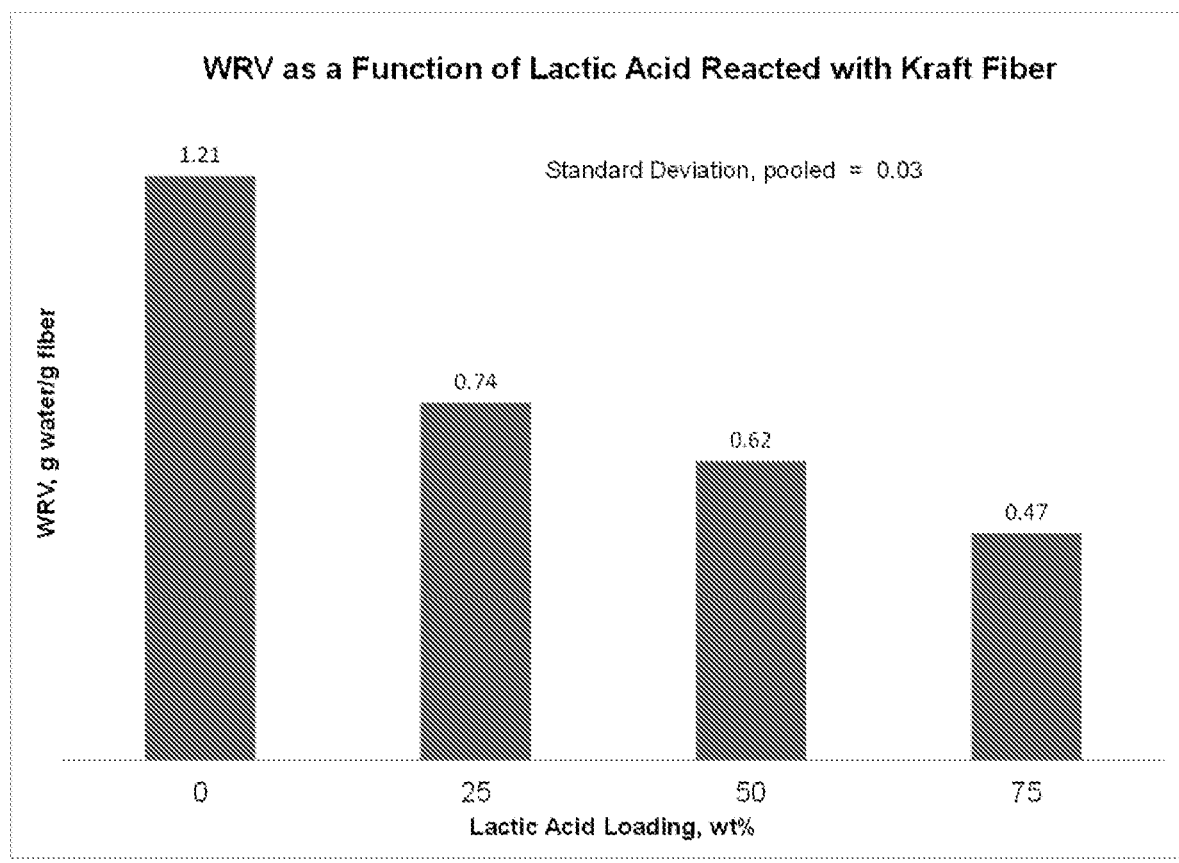
FIG. 2 shows a graph of water retention values (WRV) of various samples as a function of treatment with varying amount of lactic acid-treated fiber.

As shown in FIG. 2, lactic acid treated fiber has a much lower affinity for, or interaction with, water than untreated fibers. Fibers with low WRV ratios are known to release more water during a pressing operation (exit a press at higher solids) and, therefore, require much less energy to dry than fibers with higher WRV ratios.

Example 4

Development of Polymer Composites Containing Lactic Acid Modified Cellulose Nanofibrils This example demonstrates the improved compatibility of lactic acid-treated fibers with hydrophobic thermoplastic resins—specifically polypropylene and polylactic acid.

The following data was generated at the University of Maine Advanced Structures and Composites Center (Orono, Me.) testing the properties of polypropylene test pieces with and without the addition of lactic acid treated nanocellulose (both in the form of 3.5 mm granules and a ball milled powder). Unless otherwise specified, the granules were produced by passing dried esterified nanocellulose through a Wiley mill with a 0.5 mm screen, and the balled milled sampled was produced by processing the granules in a ball mill for several days.

Surface modified cellulose nanofibrils (CNFs) were mixed with polypropylene (PP) and polylactic acid (PLA) using thermal compounding processes. A batch mixing process was applied. The lactic acid modified CNFs will be treated as an additive. Masterbatches of highly loaded CNFs at 40 wt. % in polymers were prepared as the first step and then the masterbatches were diluted using fresh polymer to the final loading of CNFs using a twin-screw co-rotating extruder. The compounding formulations for the final CNFs polymer composites in weight ratios are shown in Table 3. After compounding, an injection molding process was used to manufacture samples for tensile, flexural, and impact tests according to the ASTM standards D638, D790 and D256. The tensile modulus, tensile strength, flexural modulus, flexural strength, and impact strength are reported herein.

TABLE 3

| Composite | Polymer (Parts) | Modified CNFs (Parts) | MAPP (Parts) | Sample Name |
|---|---|---|---|---|
| PP | 100 | — | — | PP |
| PP + 5% CNFs | 95 | 5 | — | PC5 |
| PP + 5% CNFs + 2.5% MAPP | 92.5 | 5 | 2.5 | PPC5M |
| PP + 10% CNFs | 90 | 10 | — | PC10 |
| PP + 20% CNFs | 80 | 20 | — | PC20 |
| PLA | 100 | — | — | PLA |
| PLA + 5% CNFs | 95 | 5 | — | PLAC5 |

ABBREVIATIONS

PP—polypropylene
PPC5M—PP+CNFs (5 wt. %)+MAPP (2.5 2t. %)
PC5—PP+CNFs (5 wt. %)
PC10—PP+CNFs (10 wt. %)
PBC10—PP+Ball milled CNFs (10 wt. %)
PC20—PP+CNFs (20 wt. %)

Figure 3:
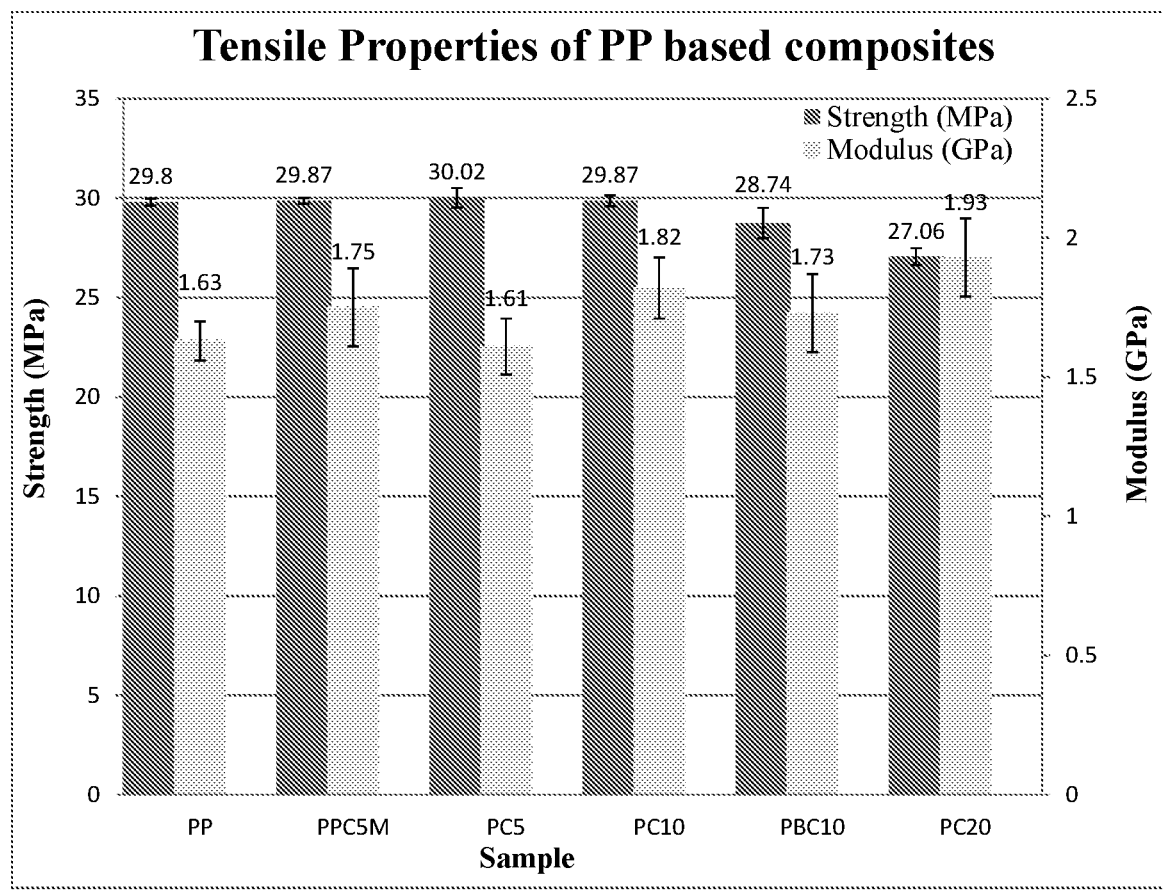
FIG. 3 shows an exemplary graph of the tensile properties of PP based composites including strength (MPa) and modulus (GPa).
Figure 4:
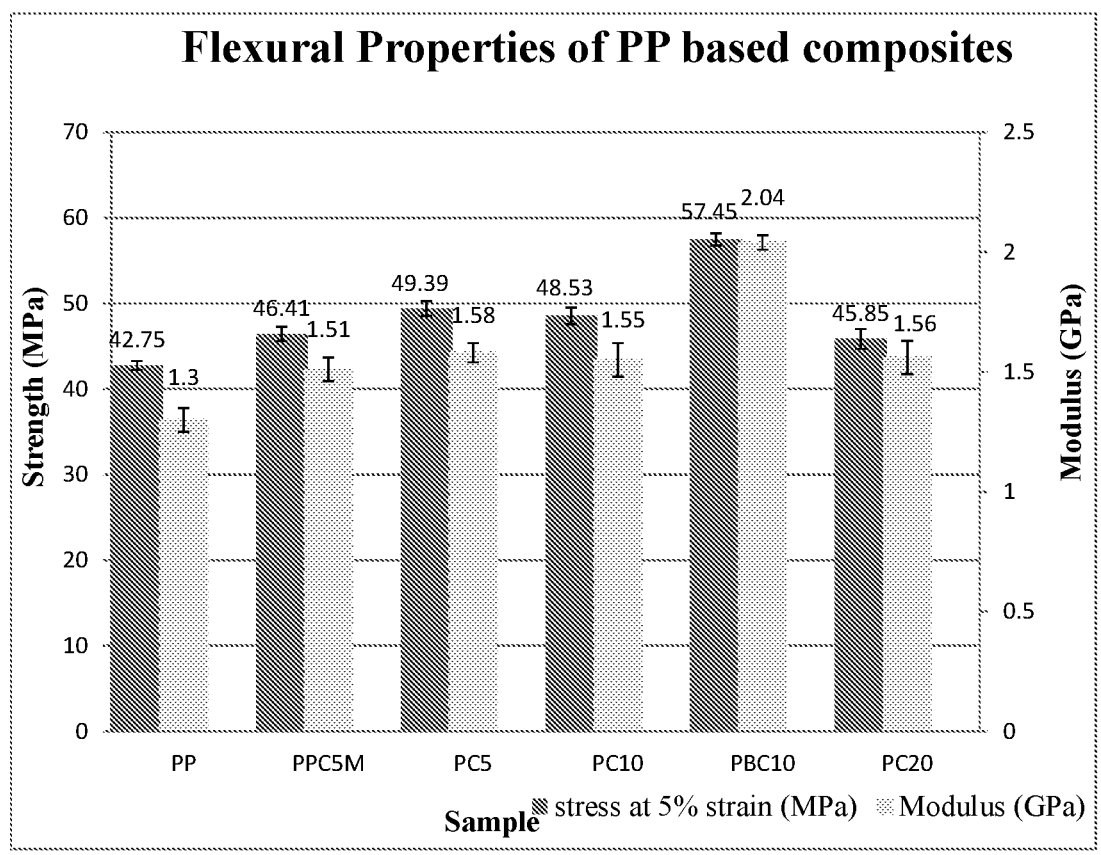
FIG. 4 shows an exemplary graph of the flexural properties of PP based composites including strength (MPa) and modulus (GPa).
Figure 5:
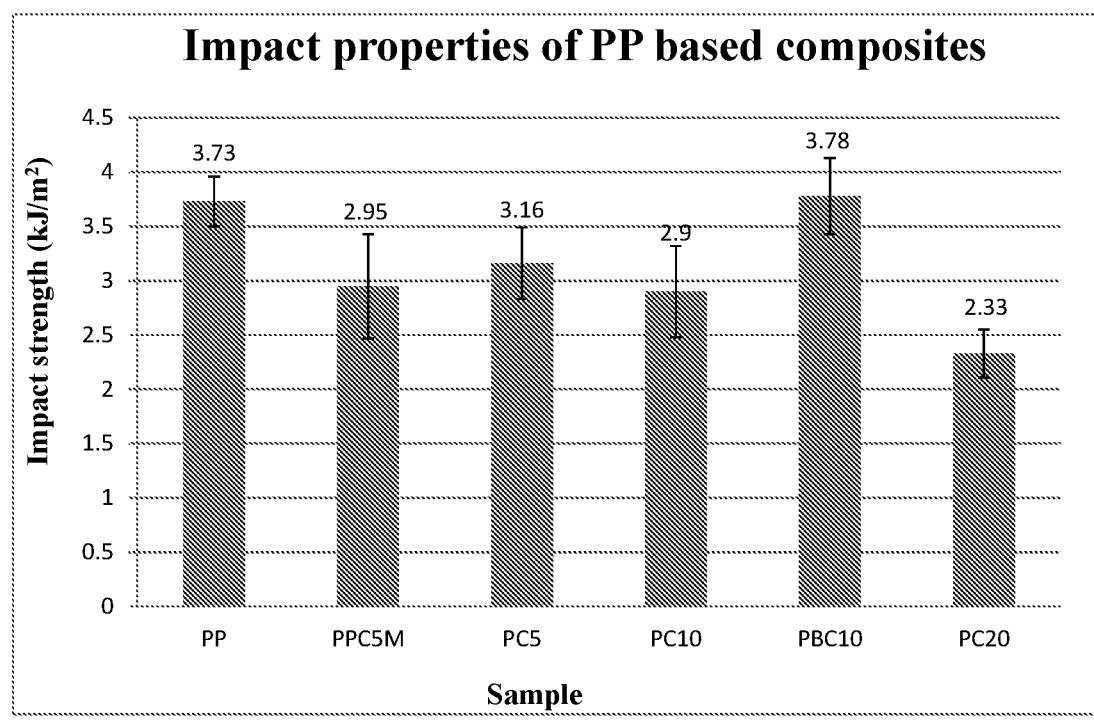
FIG. 5 shows an exemplary graph of the impact properties of PP based composites ($kJ/m^2$).

FIGS. 3-5 show the tensile modulus, tensile strength, flexural modulus, flexural stress at 5% strain, and impact strength for all the composites. After ball milling, the composites were manufactured using the same process. The obtained sample was designated as PBC10.

FIG. 3 shows the tensile properties of PP based composites including strength (MPa) and modulus (GPa). FIG. 4 shows the flexural properties of PP based composites including strength (MPa) and modulus (GPa). FIG. 5 shows the impact properties of PP based composites (kJ/m²).

Figure 6:
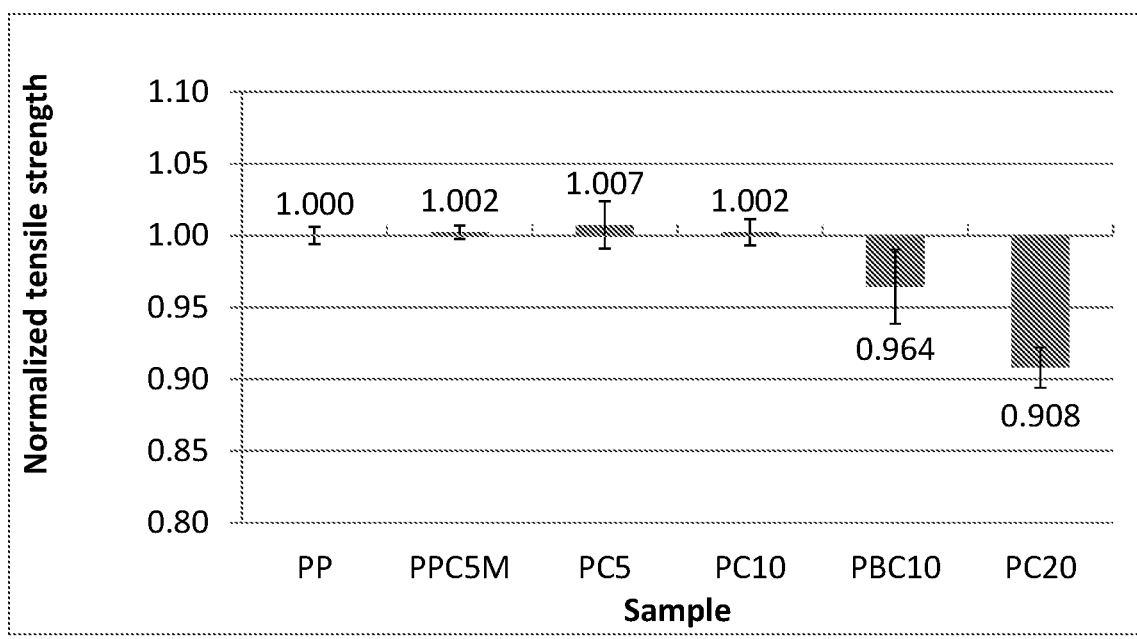
FIG. 6 shows an exemplary graph of the normalized tensile strength of various composites as compared to PP alone.
Figure 7:
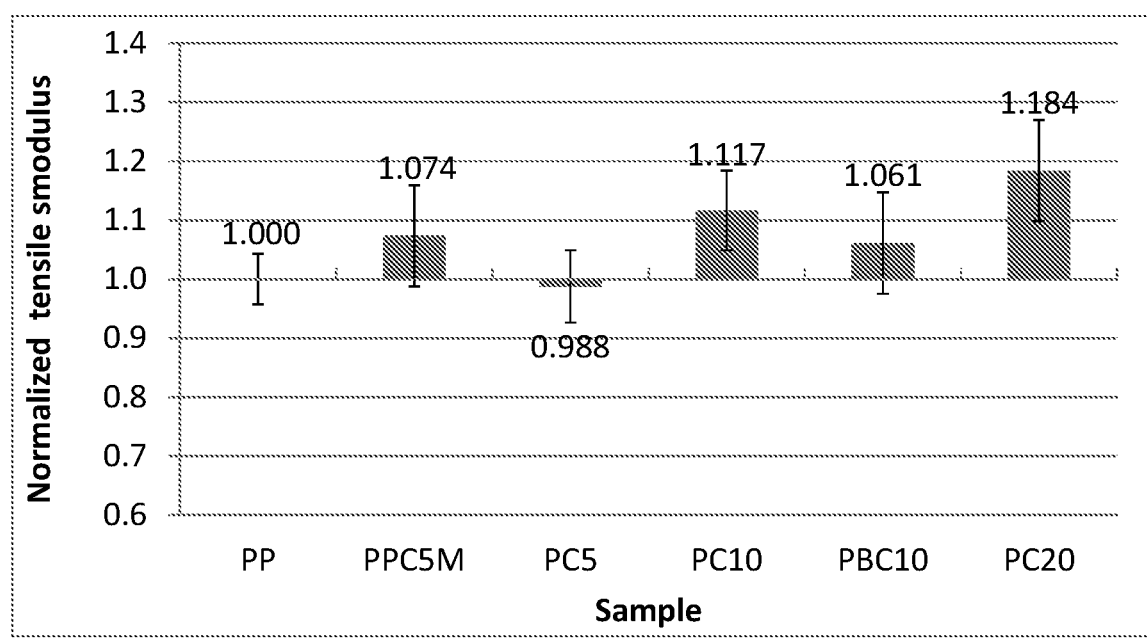
FIG. 7 shows an exemplary graph of the normalized tensile modulus of various composites as compared to PP alone.
Figure 8:
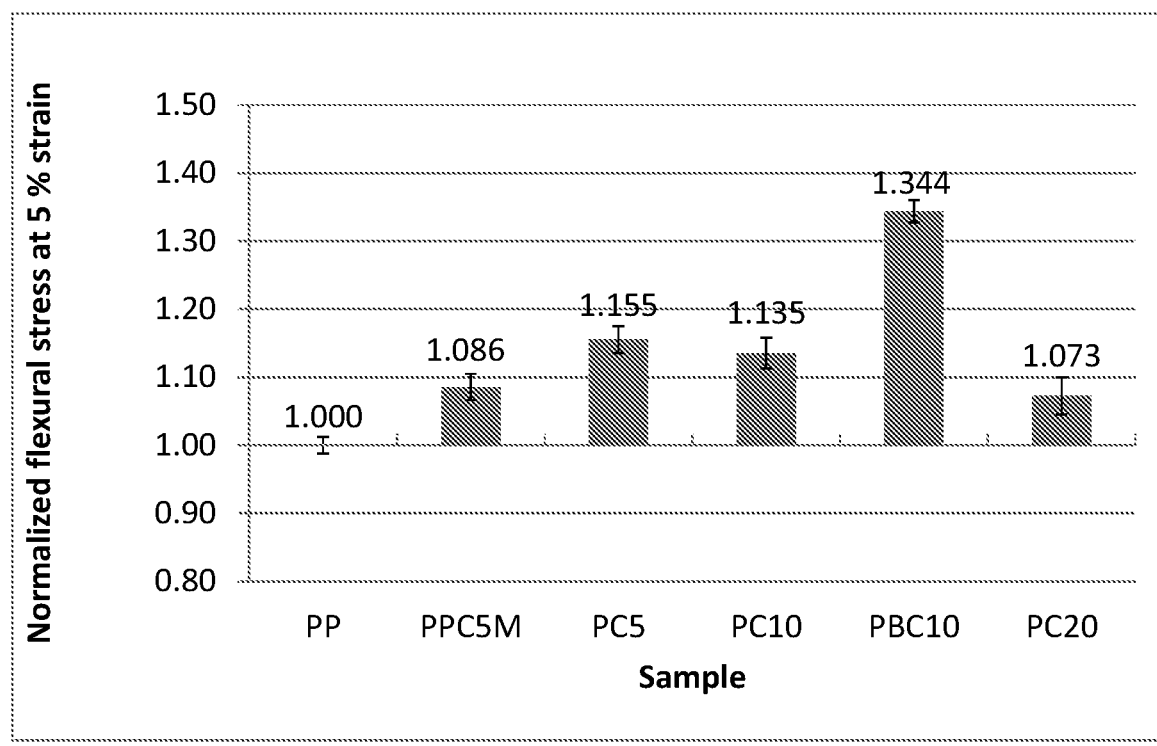
FIG. 8 shows an exemplary graph of the normalized flexural stress at 5% strain of various composites as compared to PP alone.
Figure 9:
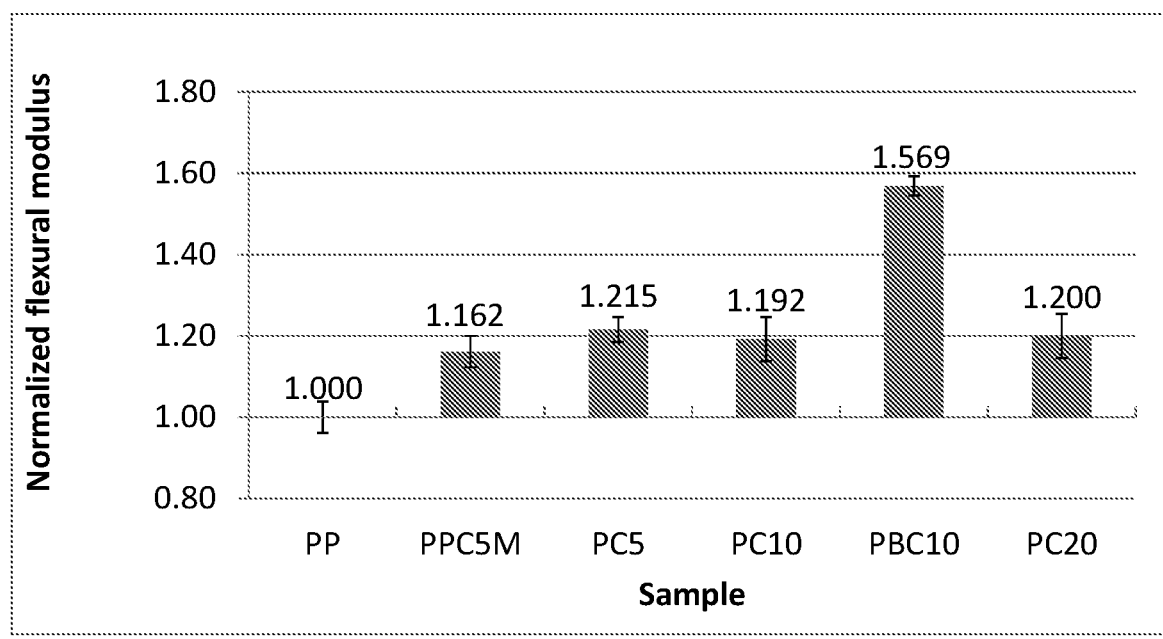
FIG. 9 shows an exemplary graph of the normalized flexural modulus at 5% strain of various composites as compared to PP alone.
Figure 10:
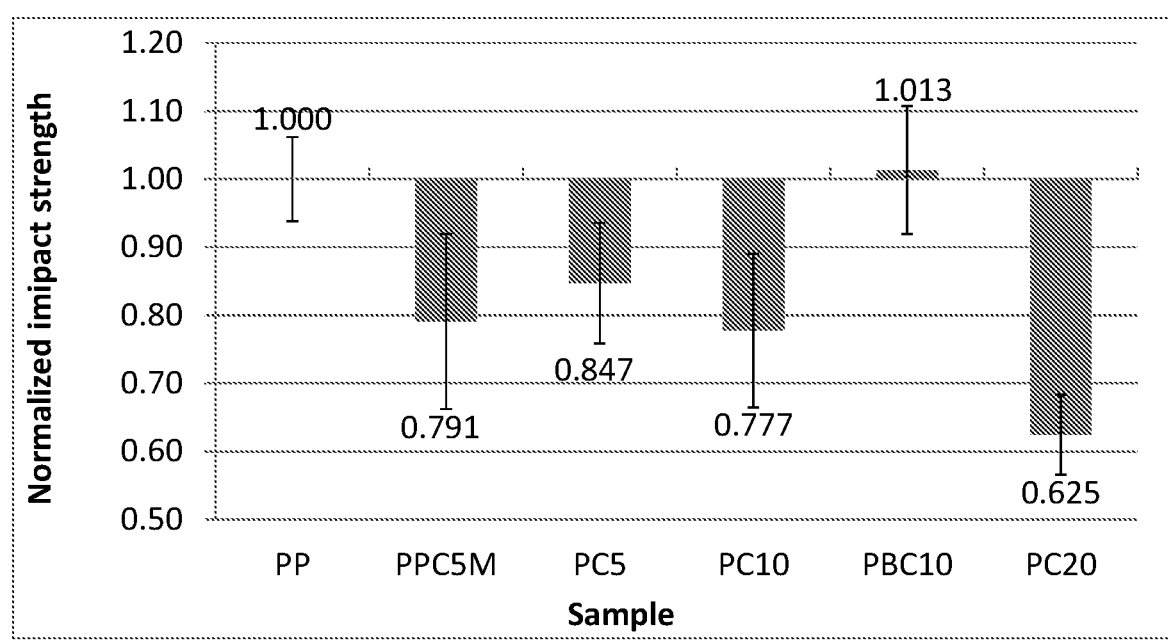
FIG. 10 shows an exemplary graph of the normalized impact strength of various composites as compared to PP alone.

FIGS. 6-10 show the normalized mechanical properties of the composites relative to polypropylene (PP) alone. Specifically, FIG. 6 shows the normalized tensile strength of various composites as compared to PP alone. FIG. 7 shows the normalized tensile modulus of various composites as compared to PP alone. FIG. 8 shows the normalized flexural stress at 5% strain of various composites as compared to PP alone. FIG. 9 shows the normalized flexural modulus at 5% strain of various composites as compared to PP alone. FIG. 10 shows the normalized impact strength of various composites as compared to PP alone.

We claim:

1. A process for the production of a composite thermoplastic polymer comprising the steps of:
   (a) providing cellulose nanofibrils (CNFs);
   (b) associating the CNFs with an organic acid to form a mixture;
   (c) heating the mixture to a temperature between 100° C. and 120° C. for at least ten minutes to form treated CNF, wherein the water retention value (WRV) of the treated CNFs is decreased by at least 10% as compared to untreated CNFs as measured by test method TAPPI UM 256 μm-15; and
   (d) mixing the treated CNFs of step (c) with a hydrophobic thermoplastic polymer to product a composition comprising at least 20% by weight of the treated CNFs.

2. The method of claim 1, wherein the organic acid is associated with the CNFs in a ratio of at least 1:1 by weight.

3. The method of claim 2, wherein the organic acid is associated with the CNFs in a ratio of at least 6:1 by weight.

4. The method of claim 1, wherein the organic acid is selected from the group consisting of lactic acid, levulinic acid, formic acid, acetic acid, propionic acid, butyric acid, valeric acid, caproic acid, oxalic acid, malic acid, citric acid, benzoic acid, and carbonic acid.

5. The method of claim 1, wherein the organic acid is lactic acid.

6. The method of claim 1, wherein the mixture is heated for at least 1 hour.

7. The method of claim 1, wherein the mixture is heated for at least 24 hours.

8. The method of claim 1, wherein the WRV is decreased by at least 50%.

9. The method of claim 1, wherein at least one of the associating and heating steps is carried out at or below atmospheric pressure.

10. The method of claim 1, wherein at least one of the associating and heating steps is carried at a pressure between 20 torr and 3 bar, inclusive.

* * * * *

UNITED STATES PATENT AND TRADEMARK OFFICE
CERTIFICATE OF CORRECTION

PATENT NO. : 10,570,563 B2
APPLICATION NO. : 15/573712
DATED : February 25, 2020
INVENTOR(S) : Michael A. Bilodeau Page 1 of 1

It is certified that error appears in the above-identified patent and that said Letters Patent is hereby corrected as shown below:

In the Claims

In Claim 1, Column 10, Line 11, replace "CNF" with --CNFs--;

In Claim 1, Column 10, Line 14, replace "μm" with --um--.

Signed and Sealed this
Tenth Day of November, 2020

Andrei Iancu
*Director of the United States Patent and Trademark Office*